Patented Nov. 17, 1953

2,659,661

UNITED STATES PATENT OFFICE 2,659,661

PROCESS FOR THE PRODUCTION OF MAGNESIUM HYDROXIDE

Hellmuth K. Keitel, Kassel, Germany

No Drawing. Application July 13, 1951,
Serial No. 236,688

14 Claims. (Cl. 23—201)

Previously it was thought that the precipitation of $Mg(OH)_2$ by ammonia could not be carried out in the presence of an ammonium salt or salts (see D'Ans, Lehrbuch der Anorganischen Chemie 1947, page 606: "Magnesium-hydroxide is not precipitated by means of ammonium-hydroxide in the presence of ammonium salts"). On the other hand this reaction seems highly desirable in practice because in certain industries large amounts of liquids occur containing ammonium salts in addition to magnesium salts. It is therefore advantageous to recover the magnesium from these liquids in a simple way and in the form of a compound which may be used in industry.

According to the present invention it has now been found that it is possible to precipitate magnesia from liquids composed as described above and in sufficiently pure form for most industrial purposes in the following way:

A solution of a magnesium salt, for instance, a solution preferably of magnesium sulfate (or e. g. magnesium chloride or phosphate or an organic magnesium salt) is introduced simultaneously with ammonia into an approximately neutral liquid, especially the mother liquors recycled from the process; water may be used to start the process. Of course the magnesium salt must be soluble in the said liquid and ammonia must be absorbed by this liquid. The ammonia may be introduced in a gaseous state or (dissolved in the liquid as a preferably concentrated) solution. The continuous introduction of the two substances is preferably carried out while slowly stirring the mixture. Preferably ammonia is used in excess, especially in an amount about double that chemically equivalent to the amount of the magnesium salt.

According to a preferred form of carrying out the process temperatures between 50 and 80° C. especially 60 and 80° C. are used. $Mg(OH)_2$ is precipitated quickly having a particle size of $5\mu$–$50\mu$. The reaction stops under the above mentioned conditions when about 66% of the magnesium introduced as salt is precipitated as $Mg(OH)_2$; the magnesia is easily removed by filtering or centrifuging.

The mother liquor contains besides the surplus ammonia the formed ammonium salt and the unreacted magnesium salt. The free ammonia is recovered from the mother liquor in a way known per se, for instance by applying a vacuum or by applying steam to it or by both methods. The ammonium salt may be obtained in the form of a double salt by evaporating or by other methods, for instance, by adding additional amounts of the starting magnesium salt in solid form and finally filtering it.

It is advisable to recycle the mother liquor of the double salt—preferably continuously—into the starting reaction mixture. It may also be advisable to carry out the reaction under increased pressure, preferably up to 0.5 atm., thereby obtaining higher concentrations of ammonium sulfate.

EXAMPLE

An ammonium schoenite $(NH_4)_2SO_4$, $MgSO_4$ mother liquor of the composition 40 g./l. $(NH_4)_2SO_4$
245 g./l. $MgSO_4$
965 g./l. $H_2O$ and having $d=1.250$ at 20° C. is used. 45 m.³ of this liquor and 4.3 t. gaseous ammonia are introduced into a gastight closed vessel equipped with a stirring device in which 5 m.³ of the same mother liquor are contained having a temperature of about 60° C. After about 3 hours the reaction is finished and 3.62 tons magnesium-hydroxide ($=2.5$ t. MgO) are precipitated. This may take about 2 hours. After the precipitation of the $Mg(OH)_2$ the liquor has the following composition:

40 g./l. $NH_3$
175 g./l. $(NH_4)_2SO_4$
80 g./l. $MgSO_4$
835 g./l. $H_2O$
$d=1.130$ at 60° C.

After separating the precipitated magnesium-hydroxide by e. g. filtering and expelling the free ammonia in a way known per se 16 tons magnesium-sulfate ($=19$ tons kieserite) are added in the form of calcined finely ground kieserite ($MgSO_4.H_2O$) with stirring to the mother liquor rich in ammonium sulfate. The expelled ammonia is introduced into the next process for precipitating $Mg(OH)_2$. The kieserite reacts with the development of heat and 17 tons of ammonium schoenite are precipitated (calculated as water-free), which are separated after cooling. 50 m.³ of the mother liquor thus obtained is recycled to the starting reaction.

While the invention has been explained by way of example, it is understood that many other embodiments of it are possible within the scope of the invention.

What I claim is:

1. Process for the production of magnesium hydroxide from a cooled mother liquor containing a magnesium salt and an ammonium salt in amounts corresponding to the residue after cooling, which comprises introducing the motor liquor containing said magnesium and ammonium salts simultaneously with an excess of ammonia into a further portion of mother liquor, precipitating magnesium hydroxide, stopping said precipitation when about 66% of the theoretical amount of magnesium hydroxide has been precipitated, filtering off the precipitated magnesium hydroxide, expelling excess ammonia from the resulting liquor, then adding thereto a solid magnesium salt of the same identity as the magnesium salt contained in said starting mother liquor in an amount in excess of the ammonium salts present in said mother liquor, precipitating an ammonium-magnesium double salt, cooling the mixture and separating said double salt and recycling said mother liquor to said further portion of liquor.

2. Process according to claim 1, in which the mother liquor containing magnesium and ammonium salts and the added ammonia are introduced into said further portion of mother liquor with continuous stirring, said ammonia being used in gaseous form and in an amount in excess of approximately twice the theoretical equivalent of the magnesium salt.

3. Process according to claim 1, in which the precipitation of magnesium hydroxide takes place above 50° C.

4. Process according to claim 1, in which the precipitation of magnesium hydroxide takes place between 60 and 80° C.

5. Process according to claim 1, in which the concentration of ammonium salts in the starting mother liquor is 40 gr. per liter.

6. Process according to claim 1, in which the precipitation of the magnesium hydroxide is carried out during a period of about three hours.

7. Process according to claim 1, in which the expelled ammonia is recycled for further precipitation of magnesium hydroxide.

8. Process for the production of magnesium hydroxide from a cooled mother liquor containing a magnesium salt and an ammonium salt in amounts corresponding to the balance after cooling, which comprises introducing the mother liquor containing said magnesium and ammonium salts simultaneously with an excess of ammonia into another portion of mother liquor, precipitating magnesium hydroxide, stopping said precipitation when about 66% of the theoretical amount of magnesium hydroxide has been precipitated, filtering off the precipitated magnesium hydroxide, expelling excess ammonia from the resulting liquor, evaporating said mother liquor and precipitating an ammonium-magnesium double salt, cooling the mixture and separating said double salt and recycling said mother liquor to said further portion of liquor.

9. Process according to claim 8, in which the mother liquor containing magnesium and ammonium salts and the added ammonia are introduced into said further portion of mother liquor with continuous stirring, said ammonia being used in gaseous form and in an amount in excess of approximately twice the theoretical equivalent of the magnesium salt.

10. Process according to claim 8, in which the precipitation of magnesium hydroxide takes place above 50° C.

11. Process according to claim 8, in which the precipitation of magnesium hydroxide takes place between 60 and 80° C.

12. Process according to claim 8, in which the concentration of ammonium salts in the starting mother liquor is 40 gr. per liter.

13. Process according to claim 8, in which the precipitation of the magnesium hydroxide is carried out during a period of about three hours.

14. Process according to claim 8, in which the expelled ammonia is recycled for further precipitation of magnesium hydroxide.

HELLMUTH K. KEITEL.

References Cited in the file of this patent

UNITED STATES PATENTS

| Number | Name | Date |
| --- | --- | --- |
| 1,986,509 | MacIntire | Jan. 1, 1935 |
| 2,258,310 | Abbott | Oct. 7, 1941 |

FOREIGN PATENTS

| Number | Country | Date |
| --- | --- | --- |
| 541,378 | Great Britain | Nov. 25, 1941 |